US010112550B2

(12) United States Patent
Nickel et al.

(10) Patent No.: US 10,112,550 B2
(45) Date of Patent: Oct. 30, 2018

(54) HOLDING FIXTURE

(71) Applicants: Wolfgang Nickel, München (DE); Jan-Peter Schwarz, Bad Feilnbach (DE)

(72) Inventors: Wolfgang Nickel, München (DE); Jan-Peter Schwarz, Bad Feilnbach (DE)

(*) Notice: Subject to any disclaimer, the term of this patent is extended or adjusted under 35 U.S.C. 154(b) by 0 days.

(21) Appl. No.: 15/545,696

(22) PCT Filed: Jan. 22, 2016

(86) PCT No.: PCT/EP2016/051363
§ 371 (c)(1),
(2) Date: Jul. 22, 2017

(87) PCT Pub. No.: WO2016/116610
PCT Pub. Date: Jul. 28, 2016

(65) Prior Publication Data
US 2018/0001832 A1    Jan. 4, 2018

(30) Foreign Application Priority Data

Jan. 23, 2015 (DE) ............... 20 2015 100 327 U (51) Int. Cl.
*B60N 2/26* (2006.01)
*B60N 2/28* (2006.01)
(Continued)

(52) U.S. Cl.
CPC ............ *B60R 11/00* (2013.01); *B60N 2/2824* (2013.01); *B60N 2/2827* (2013.01);
(Continued)

(58) Field of Classification Search
CPC ............. B60N 2/2887; B60R 11/0264; B60R 11/0252; B60R 11/00; B60R 2011/0012
(Continued)

(56) References Cited

U.S. PATENT DOCUMENTS 5,332,285 A    7/1994  Sinnhuber
5,466,044 A *  11/1995 Barley ............... B60N 2/2821
297/253 X
(Continued)

FOREIGN PATENT DOCUMENTS

DE    7521507 U      5/1976
DE    3621642 A1    11/1986
(Continued)

OTHER PUBLICATIONS

"International Preliminary Report on Patentability Issued in PCT Application No. PCT/EP2016/051363", dated Aug. 3, 2017, 12 Pages.
(Continued)

*Primary Examiner* — Rodney B White
(74) *Attorney, Agent, or Firm* — Talem IP Law, LLP (57) ABSTRACT

A holding device for fitting in a motor vehicle is provided. This includes a base plate which may be positioned in an area of a vehicle seat, with a front edge in the vehicle axial direction and a rear edge in the vehicle axial direction, wherein the base plate has two latching devices on the rear edge for connecting in each case with a fastening point of a motor vehicle. This base plate has in each case on the front and rear edge a front and rear locating device which is hinged to the base plate and designed so that the base plate may be fixed immovably in the area of the vehicle seat. The latching devices are connected to a coupling element in a hinged and lockable manner, and the coupling element is connected in a hinged and lockable manner to the rear edge of the base plate.

13 Claims, 7 Drawing Sheets

(51) Int. Cl.
  *B60R 11/00* (2006.01)
  *G01D 11/30* (2006.01)
  *A01K 1/00* (2006.01)
  *B60R 11/02* (2006.01)
  *F25D 19/00* (2006.01)

(52) U.S. Cl.
  CPC ........... *B60N 2/2887* (2013.01); *G01D 11/30* (2013.01); *A01K 1/0035* (2013.01); *B60R 11/0252* (2013.01); *B60R 11/0264* (2013.01); *B60R 2011/0012* (2013.01); *B60R 2011/0082* (2013.01); *F25D 19/00* (2013.01)

(58) Field of Classification Search
  USPC ............................................. 297/253, 256.16
  See application file for complete search history.

(56) References Cited

U.S. PATENT DOCUMENTS

| | | | |
|---|---|---|---|
| 5,628,439 A | 5/1997 | O'Hara | |
| 7,097,245 B2* | 8/2006 | Barker | B60N 2/2803 297/256.16 X |
| 7,328,946 B2* | 2/2008 | Hendrikus Van Montfort | B60N 2/286 297/253 |
| 7,467,825 B2* | 12/2008 | Jane Santamaria | B60N 2/2824 297/253 |
| 7,753,445 B2* | 7/2010 | Kassai | B60N 2/2824 297/253 |
| 8,366,192 B2* | 2/2013 | Clement | B60N 2/2821 297/253 X |
| 8,973,987 B2* | 3/2015 | Mo | B60N 2/2884 297/256.16 X |
| 2003/0020308 A1* | 1/2003 | Pacella | B60N 2/2806 297/256.16 |
| 2006/0006714 A1* | 1/2006 | Van Geer | B60N 2/2806 297/256.16 |
| 2007/0069562 A1* | 3/2007 | Van Montfort | B60N 2/286 297/253 |
| 2008/0224516 A1* | 9/2008 | Vegt | B60N 2/2824 297/256.16 |
| 2008/0277984 A1* | 11/2008 | Carine | B60N 2/2806 297/253 |
| 2008/0303321 A1 | 12/2008 | Powell | |
| 2009/0273215 A1* | 11/2009 | Barker | B60N 2/2821 297/253 |
| 2010/0052384 A1* | 3/2010 | Yang | B60N 2/2824 297/253 |
| 2011/0233374 A1 | 9/2011 | Clement et al. | |
| 2014/0361589 A1* | 12/2014 | Hou | B60N 2/2824 297/256.16 |
| 2015/0076878 A1 | 3/2015 | Jane Santamaria | |

FOREIGN PATENT DOCUMENTS

| | | |
|---|---|---|
| DE | 4433997 A1 | 3/1996 |
| DE | 4244377 A1 | 6/1996 |
| DE | 102004018940 A1 | 11/2005 |
| DE | 202007004093 U1 | 8/2007 |
| DE | 102007048406 A1 | 2/2009 |
| DE | 102009058892 A1 | 7/2010 |
| EP | 0164909 B1 | 1/1988 |
| EP | 0485121 B1 | 3/1995 |
| EP | 0734901 B1 | 10/1996 |
| EP | 1369294 A1 | 10/2003 |
| ES | 1093530 U | 11/2013 |
| SE | DE4230879 A1 | 4/1993 |
| WO | WO2005123447 A1 | 12/2005 |

OTHER PUBLICATIONS

"International Search Report Issued in PCT Application No. PCT/EP2016/051363", dated Apr. 20, 2016, 10 Pages. (English translation included).

Search Repoert of the Priority Application DE202015100327.7; dated Nov. 11, 2015, 6 pages.

* cited by examiner

HOLDING FIXTURE

CROSS-REFERENCE TO RELATED APPLICATION

This application is the U.S. National Stage Application of International Application No. PCT/EP2011/051363, filed Jan. 22, 2016, which claims priority to German Application No. DE202015100327.7, filed Jan. 23, 2015.

BACKGROUND

Field of the Invention

The present invention relates to a holding fixture.

Related Art

DE 195 01 908 A1 discloses a stand which is connected to a bodywork or vehicle side part via a fastening point which lies opposite holding points in the form of a quick-release connector and is fastened to a frame with torsional stiffness. An embodiment reveals a tripod arrangement which, once the vehicle has been equipped with mating parts for the holding points fixed to the seat or bodywork, may be installed and removed without major fitting effort.

EP 0 485 121 B1 discloses a child car seat. This includes a child car seat body, support means for holding the child car seat body on a substantially horizontal surface, and means which on the one hand engage with the child car seat body and may be attached to an adult seatbelt, so that the child car seat body is held back from any forwards directed movement. The backrest of the child car seat body is designed to reach a stop against any rearwards extending protrusion on the vehicle in front of the substantially horizontal surface. Provided for this purpose is a frame which may be placed on a seat and then fixed by parts of a seatbelt. To support the front section, the frame is provided with a fork which rests on a floor panel in the foot well.

Disclosed in EP 0 164 909 B1 is a child safety seat. This child safety seat includes a device for holding a seat component in a vehicle and a holding device for fastening the safety seat in the vehicle, wherein the holding device is so shaped that, when the safety seat is fastened in the vehicle, a first and a second end section of the holding device, spaced apart from one another, each make contact with a seat of the vehicle and with the vehicle floor next to the seat. The seat component is attached movably to an intermediate part of the holding device lying between the end sections, with the intermediate part of the holding device being so shaped that, when the safety seat is fastened in a vehicle, the position of the seat component relative to the holding device may be adjusted as desired via a movement along the intermediate part between positions which include a reclined position and a more upright position.

The device for fastening the safety seat disclosed therein makes contact with an upper end on a backrest and rests with a lower end on the vehicle floor. Bracing against the vehicle seat is effected through a lap seatbelt.

DE 75 21 507 discloses a support stand which is fixed between two seats arranged one behind the other, wherein one of the seats has at least one fastening point.

In the documents DE 10 2004 018 940 A1, DE 42 44 377 A1, EP 0734901 B1, DE 36 21 642 A1 and DE 42 30 879 A1, further holding devices for child car seats or child car seats with holding devices fitted in them are described.

DE 10 2007 048 406 A1 discloses a child car seat for fitting in a vehicle against its direction of travel. This child car seat includes a bracket overhanging a front free edge of a seating surface of the child car seat for supporting the front of the child car seat, with clearance from a backrest of a seat belonging to the vehicle. This bracket is mounted rotatably around an element running transversely. Also provided are profile sections extending against the direction of travel, the free ends of which may be connected with a latching device (ISOFIX) provided in a vehicle seat. The seat also has, at an end which is in front in the direction of travel, a height-adjustable rod, by means of which the edge of the seat which is in front in the direction of travel may be supported on a floor surface in the foot well of a vehicle. This rod is hinged around a rotary axis.

US 2008/0 303 321 A1 discloses a base fixture for a child car seat. This base fixture includes a base for holding a child car seat, wherein there is provided at a front end of the base a support device extending downwards towards the floor of the foot well. This support device is hinged to the base via an axis. Provided at the rear end of the base, lying against the direction of travel, are two latching devices for connecting to an ISOFIX device located on a vehicle seat. Provided at the same end of the base is a hinged bracket, mounted rotatably around an axis of rotation.

Disclosed in DE 10 2009 058 892 A1 is a stowage space fixture. This stowage space fixture has a roughly L-shaped base body, wherein one short leg of the L-shaped base body is provided with rollers which may be mounted on a floor of a foot well. In addition, a bracket, similarly provided with rollers, is mounted rotatably on the longer leg of the L-shaped base body. Through vertical arrangement of the bracket, the base body may be made in the form of a truck, for the movement of equipment such as a computer. Also provided is a facility for engaging in a locating device formed on a vehicle seat.

SUMMARY

The problem of the present invention is to provide a holding fixture for fitting in a motor vehicle which may be produced cost-effectively and may be fixed and fitted in a motor vehicle in a simple manner.

A further problem of the present invention is to provide a holding fixture for fitting in a motor vehicle, on which a wide variety of payloads, in particular measuring instruments, may be arranged in a predefined position.

To solve these problems, the invention has the features specified in claim 1. Advantageous developments thereof are set out in the dependent claims.

According to the invention, a holding device for fitting in a motor vehicle is provided. This includes a base plate which may be positioned in the area of a vehicle seat, with a front edge in the vehicle axial direction and a rear edge in the vehicle axial direction, wherein the base plate has two latching devices on the rear edge in the vehicle axial direction for connecting in each case with a fastening point of a motor vehicle. This base plate has in each case on the front and rear edge in the vehicle axial direction a front and rear locating device which is hinged to the base plate and designed so that the base plate may be fixed immovably in the area of a vehicle seat. The latching devices are connected to a coupling element in a hinged and lockable manner, and the coupling element is connected in a hinged and lockable manner to the rear edge of the base plate in the vehicle axial direction.

In the context of the present invention, a fastening point is understood to be holding means, e.g. an ISOFIX anchor, connected to the bodywork of a motor vehicle.

Through the provision of a front locating device on the front edge and a rear locating device on the rear edge it is possible to fit the base plate in a motor vehicle without play.

The rear locating device may be so designed that it hits against or rests on a backrest of a vehicle seat. This results in deformation of the backrest of the vehicle seat due to the contact pressure exerted by the rear locating device.

In the connection between the two latching devices and each fastening point of a motor vehicle, owing to the standardised design of the ISOFIX anchor (defined in regulation no. 14 of the Economic Commission of the United Nations for Europe (UN/ECE), there is play in and across the vehicle axial direction.

The fact that the rear locating device hits against or rests on a backrest of a vehicle seat prevents the fixture from moving due to the play in and across the vehicle axial direction between the two latching devices and the respective fastening point of a motor vehicle. The rear locating device thus prevents movement of the holding fixture due to the play described above. Due to its support on the backrest of a vehicle seat, the rear locating device also prevents movement of the holding fixture in the vertical direction. Movement in the vehicle axial direction is also prevented.

In particular, provision of the coupling element makes it possible to arrange the base plate of the holding fixture in a vehicle, by means of the latching devices and the locating devices, precisely horizontally or at a predetermined desired angle.

Specified in particular as payloads which may be mounted on the base plate, in the context of the present invention, are measuring instruments for driver assistance systems, for distance measurement, for environment recognition and for automatic braking. It is however also conceivable to mount any other objects on the base plate and to carry them on the vehicle, such as e.g. a refrigerator, a child car seat, a control system, a box for transporting animals, an air conditioner, a measuring system, a mobile office, a table, a computer or the like.

In particular, in the case of measuring equipment it is of critical importance for correct measurement results that it can be mounted and conveyed in a vehicle in an exactly predefined position, preferably horizontally.

The front locating device may be so designed that it rests on or strikes against a vertical section of a seating surface or a backrest of a vehicle seat or on a vertical or horizontal section of a foot well of a motor vehicle.

The front locating device also prevents any lifting of the holding fixture in the vertical direction and brings about the mounting of the holding fixture without play in and across the vehicle axial direction.

Because the holding fixture may be fixed immovably in the area of a vehicle by means of the latching devices and the locating devices, it is possible to mount a wide variety of payloads on the base plate of the holding fixture so that they may be conveyed in a motor vehicle, fixed immovably in the desired position.

The front and rear locating devices may be in the form of clamping brackets, which may be adjusted and locked steplessly. Alternatively, the front locating device may be in the form of a belt, in particular a tensioning belt.

Due to the fact that the clamping brackets may be fixed in any desired angular position, it is possible to arrange and fix the base plate levelled exactly horizontally in a vehicle.

In addition, the clamping brackets and/or the latching devices may be locked in their position or angular position relative to the base plate by means of suitable locking devices.

In the locked state, the locating devices and the latching devices exert such forces on the base plate that the base plate may be braced immovably in the vehicle interior.

The clamping brackets may have elastic contact means for contact with a vehicle interior, in particular a vehicle seat.

The contact means are preferably made of a synthetic material such as e.g. plastic foam, PE, rubber, ARMAFLEX, India rubber or a similar material which has a high coefficient of friction, enabling them to contribute to fixing of the holding fixture.

On account of their elasticity, the contact means may deform on being pressed on to the relevant part of the vehicle interior, so that they cling or adapt to the latter. In this way, the contact means may contribute to preventing slipping of the holding fixture transversely to the vehicle axial direction.

The contact means also prevent damage to the vehicle interior from the locating devices or clamping brackets.

The contact means may also be covered by a sleeve of nylon, synthetic leather or the like, which is fitted over the contact means using a Velcro or zip fastener or press studs. The sleeve then preferably has a high coefficient of friction, with the contact means providing the elasticity.

Alternatively, it is also possible to dispense with contact means and to provide clamping struts made of an inelastic material, preferably plastic such as e.g. PE or PTFE. Provision of similarly-made inelastic contact means is also possible.

The latching devices may be connected to a coupling frame, hinged and lockable, with the coupling frame being hinged to the rear edge of the base plate in the vehicle axial direction. The holding fixture may be designed so as to fold up. Here it is provided that the clamping brackets are arranged beneath the base plate in the folded state.

Because the holding fixture is designed so as to fold up, it may be conveyed in a simple and space-saving manner in the vehicle interior, e.g. in the car boot.

It is also possible to provide, on an underside of the holding fixture, in particular of the base plate, foot elements. These create the necessary space for the clamping brackets, since the latter are arranged beneath the base plate in the folded state.

Provision of the foot elements prevents damage to the holding fixture and in particular the clamping brackets, when removed from the vehicle for fitting on to relevant measuring equipment and for this purpose being set down on the ground.

The holding fixture may also have a measuring facility to indicate the horizontal alignment of the base plate.

A circular level or one or more spirit levels may be provided as measuring instruments.

Furthermore, in addition or as an alternative to the locking device of the rear locating device, it is possible to provide a bracing device, by means of which the rear locating device may be braced in the direction of a backrest of a vehicle seat.

The bracing device may include a ratchet device, wherein preferably the front locating device is connected to an actuating element of the ratchet device, and wherein the ratchet device is connected to the rear clamping bracket via a cable and a deflecting device in such a way that the clamping bracket is braced in the direction of a backrest of a vehicle seat.

In this way the holding fixture may be easily and firmly braced and fixed in a vehicle seat.

BRIEF DESCRIPTION OF THE DRAWINGS

The invention is explained in detail below with the aid of the drawings, which show in.

DETAILED DESCRIPTION

Figure 1:
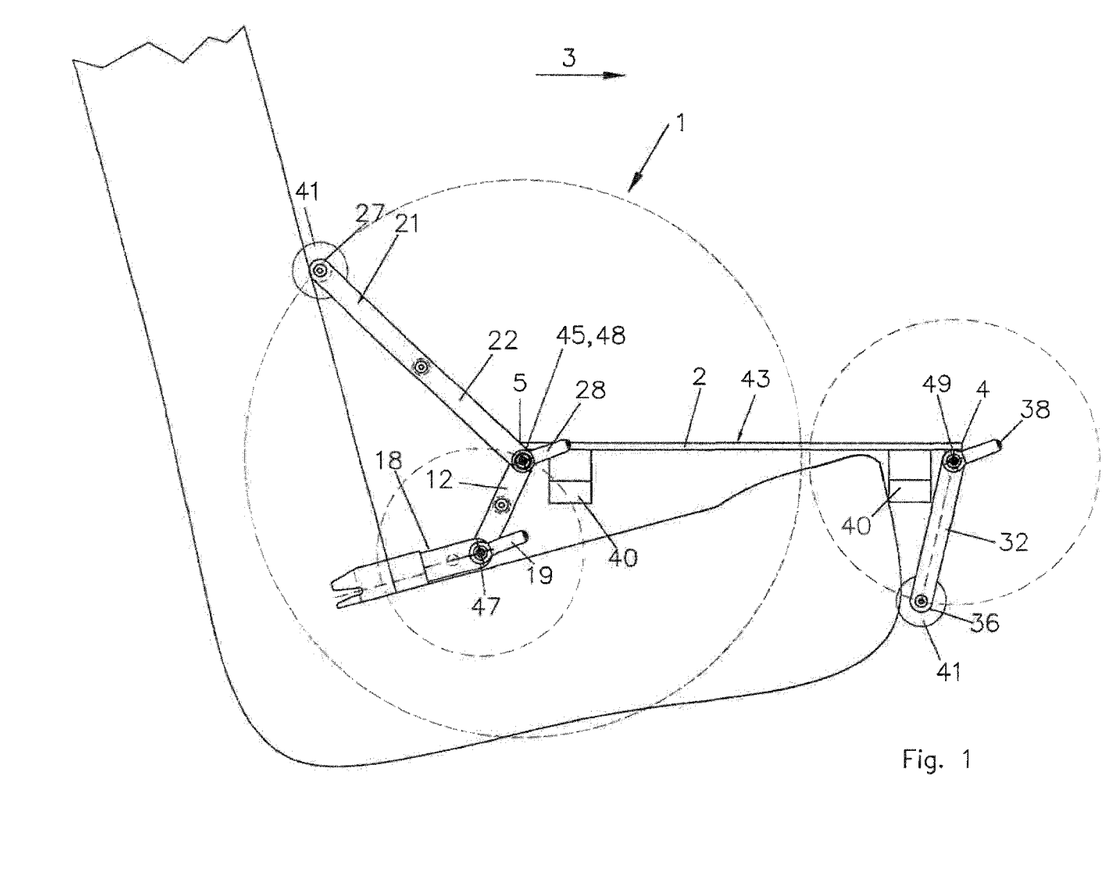
FIG. 1 a side view of a holding fixture according to the invention installed in a vehicle, FIG. 2 the holding fixture in a plan view from below, FIG. 3 the holding fixture in a side view, FIG. 4 a side view of another embodiment of the holding fixture according to the invention with a bracing device and as installed in a vehicle, FIG. 5 the holding fixture of FIG. 4 in a plan view from below, FIG. 6 the holding fixture of FIG. 4 in a side view, and FIG. 7 another embodiment of the holding fixture according to the invention with a bracing device, in a plan view from below.
Figure 2:
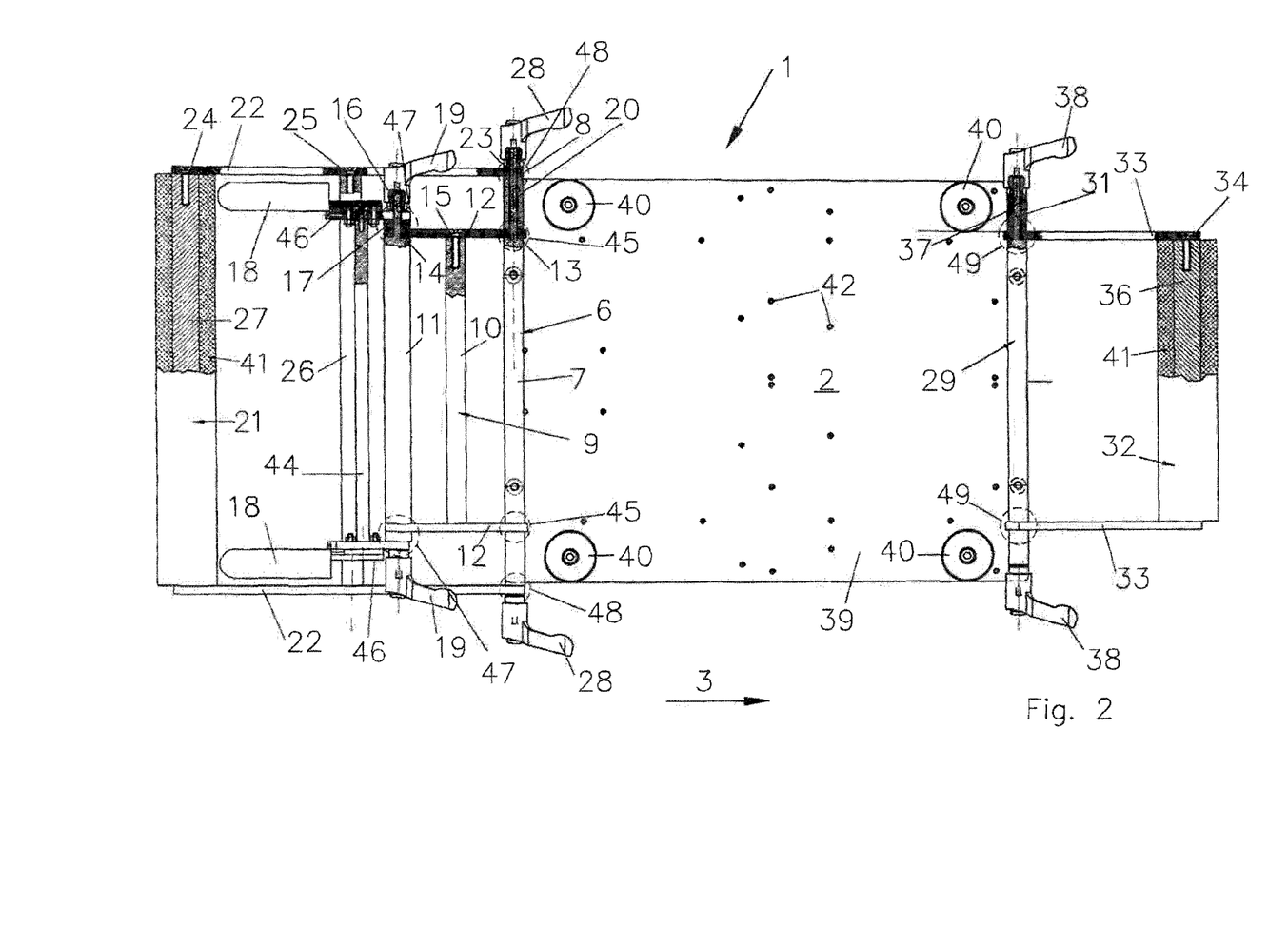
Figure 3:
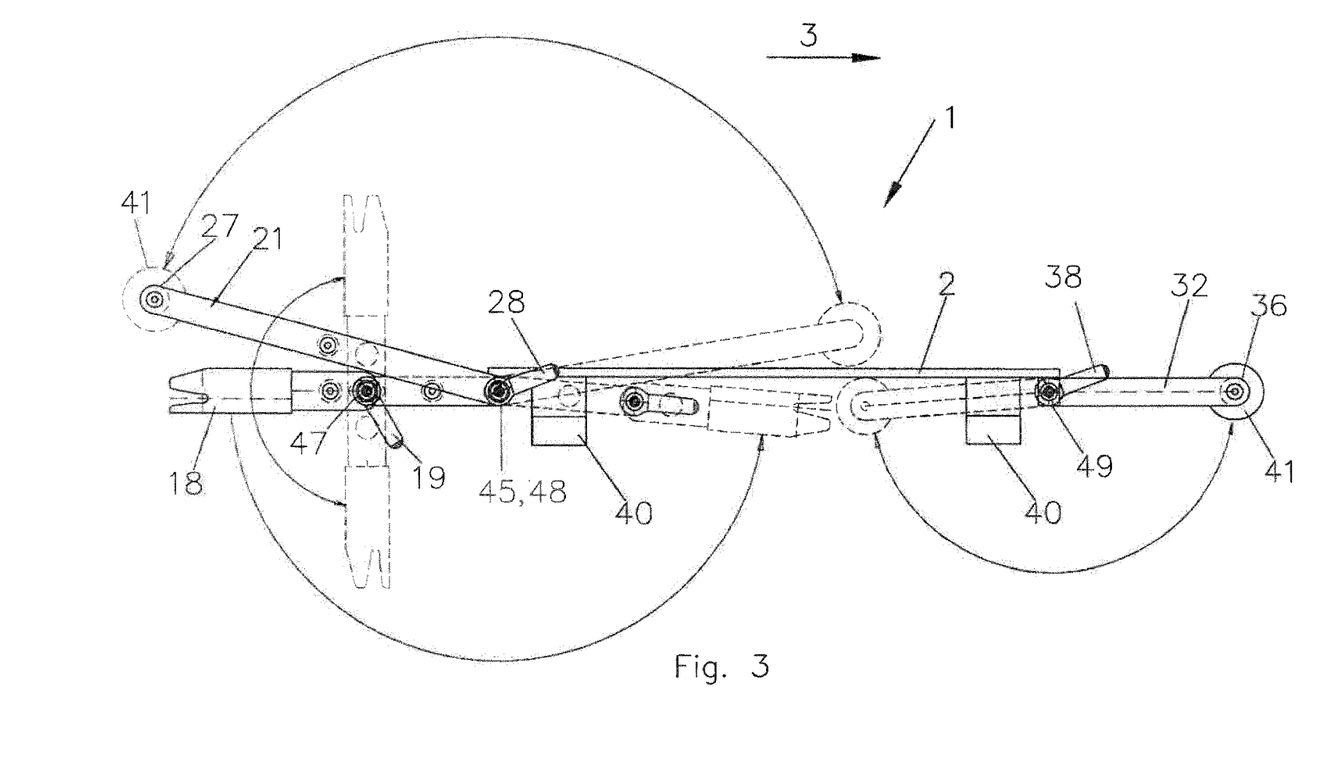

A holding fixture 1 includes a rectangular base plate 2 (FIGS. 1 to 3).

The base plate 2 has an edge 4 lying forwards in the vehicle axial direction 3 and an edge 5 lying to the rear in the vehicle axial direction 3.

Located on the rear edge 5 in the vehicle axial direction 3 is a front hinge socket 6 extending transversely to the vehicle axial direction 3.

The hinge socket 6 includes a fastening section 7 via which the hinge socket 6 is connected to the base plate 2, for example by means of screw connections.

Provided on the fastening section 7 are threaded rods 8, preferably inserted in suitable tapped holes in the fastening section 7. Alternatively, the threaded rods 8 may be moulded integrally with the fastening section 7. The threaded rods 8 therefore extend outwards from the base plate 2, transversely to the vehicle axial direction 3.

Hinged to the threaded rods 8 of the hinge socket 6 is a coupling element 9. This bearing is described as the first coupling bearing 45.

The coupling element 9 includes a reinforcing strut 10 running transversely to the vehicle axial direction 3, a connecting strut 11 likewise arranged transversely to the vehicle axial direction 3, and two longitudinal struts 12 extending in the vehicle axial direction 3.

Formed in the longitudinal struts 12 are a front hole 13 lying forwards in the vehicle axial direction 3, a rear hole 14 lying rearwards in the vehicle axial direction 3, and a centre hole 15 lying in between. The connecting strut 11 is made of a cylindrical body, at the two ends of which threaded rods 16 are similarly inserted in corresponding tapped holes and extend transversely to the vehicle axial direction 3. Alternatively, they may also be formed integrally. In order to prevent any relative movement or twisting of the connecting strut 11 and the longitudinal struts 12, a setscrew, a dowel pin or any other suitable anti-turn locking device may be provided between these elements 11, 12.

The reinforcing strut 10 is provided in the area between the two centre holes 15 of the longitudinal struts 12, with the reinforcing strut 10 being connected to the two longitudinal struts 12 by screws extending through the centre holes 15. Accordingly, blind holes with suitable threads are formed in the reinforcing strut 10.

The threaded rods 8 of the hinge socket 6 are located in the two front holes 13 lying forwards in the vehicle axial direction 3.

The threaded rods 16 of the connecting strut 11 are located in the two rear holes 14 in the vehicle axial direction 3.

In addition, these threaded rods 16 are provided with spacer sleeves 17. The spacer sleeves 17 are made e.g. of aluminium, with bevelled washers (not shown) of brass provided at the ends of the spacer sleeves 17. The bevelled washers reduce friction during use of the holding fixture 1 according to the invention between the relevant adjacent components, thereby facilitating use.

Sections 46 of latching devices 18 are rotatably hinge-mounted on the spacer sleeves 17. This support is described as the second coupling bearing 47.

Provided in the area between the sections 46 of the latching devices 18 is a spacer strut 44 running transversely to the vehicle axial direction. The spacer strut 44 defines the distance between the two latching devices 18. In particular the spacer strut 44 prevents the latching devices 18 from turning in different directions or at different angles relative to the second coupling bearing 47.

The position of the latching devices 18 relative to the coupling element and in particular relative to the connecting strut 11 may be fixed via a nut actuable by means of a lever 19. The second coupling bearing 47 may therefore be locked by means of the lever 19.

The latching devices 18 are preferably designed as snap locks so that they are able to engage suitably in the ISOFIX anchors (not shown) provided in a motor vehicle.

Quick-release snap locks (not shown) are provided for engaging in suitable snap-in noses (not shown) in the ISOFIX anchors.

Spacer sleeves 20 are also provided in the area of the front holes 13 of the longitudinal struts 12 and on the threaded rods 8 of the hinge socket 6. The spacer sleeves 20 are made e.g. of aluminium, with bevelled washers (not shown) of brass provided at the ends of the spacer sleeves 20.

In addition, the threaded rods 8 of the hinge socket 6 are provided for hinged connection with a locating device 21, at the rear in the vehicle axial direction 3. The hinged connection with the locating device 21 is described as the rear locating hinge 48.

The locating device 21 is in the form of a clamping bracket.

The clamping bracket 21 includes two rear longitudinal struts 22 extending in the vehicle axial direction 3 and respectively having a front hole 23 on a front end in the vehicle axial direction 3, and a rear hole 24 on a rear end in the vehicle axial direction 3, together with an intermediate centre hole 25.

In the area of the two centre holes 25 of the clamping bracket 21 there is fixed a connecting strut 26 mounted transversely to the vehicle axial direction 3.

For fixing the connecting strut 26, the latter has blind holes with corresponding threads, so that screws may be inserted in the centre holes 25 of the longitudinal struts 22 for fixing in the corresponding thread in the connecting strut 26.

Located in the rear hole 24 lying rearwards in the vehicle axial direction 3 is a rear clamping strut 27, similarly arranged transversely to the vehicle axial direction 3.

The rear clamping strut 27 also has corresponding blind holes with threads formed therein for connection by means of screws with the rear holes 24 of the longitudinal struts 22.

The longitudinal struts 22 are hinged to the threaded rods 8 of the hinge socket 6 via the front holes 23.

Provided for fixing the hinged connection and the position of the clamping strut 27 relative to the base plate is a nut (not shown) located on the threaded rods 8, which may be locked by means of a suitable lever 28. The lever 28 is thus provided for locking the rear locating hinge 48 and the first coupling bearing 45.

In the area of the front edge 5 of the base plate, a front hinge socket 29 is fixed to the base plate 2.

The hinge socket 29 has a fastening section 30, at the ends of which threaded rods 31 are inserted in corresponding tapped holes transversely to the vehicle axial direction 3. Alternatively, these could also be formed integrally.

A front clamping bracket 32 includes two longitudinal struts 33 extending in the vehicle axial direction 3. Formed in the longitudinal struts 33 are a front hole 34 lying forwards in the vehicle axial direction and a rear hole 35 lying to the rear against the vehicle axial direction.

Located in the area between the two front holes 34 of the longitudinal struts 33 is a front clamping strut 36, which is connected to the two longitudinal struts 33 via suitable screws extending through the two front holes 34. To hold and fix the two screws, blind holes with suitable threads (not shown) are formed in the clamping struts 36.

The threaded rods 31 of the front hinge socket are hinge-mounted in the two rear holes 35. This hinged connection with the front clamping bracket 32 is described as the front locating hinge.

Spacer sleeves 37 are provided over the longitudinal struts 33. The position of the clamping bracket 32 may be adjusted and locked by means of nuts actuable via levers 38. I.e. the front locating hinge may be locked via the levers 38. The spacer sleeves 37 are made e.g. of aluminium, with bevelled washers (not shown) of brass provided at the ends of the spacer sleeves 37.

Tubular elastic contact means 41 are provided over both the rear clamping strut 27 and the front clamping strut 36. The tubular contact means are preferably made of a synthetic material such as e.g. plastic foam, PE, rubber, ARMA-FLEX, India rubber or a similar material. The contact means may be surrounded by a sleeve (not shown). Alternatively, it is also possible to dispense with contact means. Then it is provided that the clamping struts 27, 36 are made of an inelastic synthetic material such as e.g. PU, PE or PTFE. Provision of similarly-made inelastic contact means is also possible.

The two hinge sockets 6, 29 are preferably fixed to an underside 39 of the base plate 2. Support legs 40 are also attached to the underside 39 of the base plate 2. The support legs 40 include spacers (not shown) of plastic and disc-shaped rubber elements (not shown) which are firmly screwed to the underside 39 of the base plate 2.

Provided on the top side 43 of the base plate 2 is a measuring facility (not shown), by means of which the horizontal alignment of the base plate 2 may be indicated. A circular level or one or more spirit levels may be provided as measuring instruments.

Formed in the base plate 2 are tapped holes, for fixing payloads, such as e.g. measuring equipment, to a top side 43 of the base plate 2. Alternatively, the base plate may also have T-shaped slots with corresponding sliding blocks or elements for the fixing of payloads. According to a further alternative, profile rails e.g. made of aluminium or plastic, may also be mounted on or fixed to the base plate 2.

The holding fixture 1 and in particular the clamping brackets 21, 32 and the base plate 2 are preferably made of aluminium.

The use of the holding fixture 1 according to the invention is described below.

Firstly, the desired measuring instrument is fixed to the base plate 2. Fixing of the measuring instrument may be effected e.g. by means of screws engaging in suitable tapped holes made in the base plate 2. The tapped holes may be made in the base plate in predetermined common grid patterns, so that a variety of measuring instruments may be mounted thereon.

The holding fixture 1 is then mounted on a seating surface of the vehicle seat.

The latching devices 18 are then brought into engagement with corresponding ISOFIX anchors provided in a vehicle seat.

A horizontal alignment of the base plate 2 is then made with the aid of the measuring facility. This alignment may also represent just a preliminary alignment. Depending on the geometry of the seating surface of a vehicle seat, it may be that the base plate 2 rests on an edge of the vehicle seat lying forwards in the vehicle axial direction 3.

The second coupling bearing 47 is now fixed by means of the lever 19.

A second horizontal realignment of the base plate 2 may now be necessary.

The rear clamping bracket 21 is then so actuated that its clamping strut 27 and the contact means 41 fitted to it come into contact with a backrest of a vehicle seat.

The rear locating hinge 48 and the first coupling bearing 45 are then fixed using the lever 28.

After that, the front clamping bracket 32 is so actuated that its clamping strut 36 and the contact means 41 fitted thereto make contact with a vertical section of a seating surface of a vehicle seat located forwards in the vehicle axial direction 3.

It may also be provided that firstly the rear and then the front clamping bracket 27, 32 is actuated.

Alternatively, the holding fixture may also be located in a boot space of the motor vehicle. In this connection, where applicable, tensioning belts may also be needed, connected to suitable fastening points in the vehicle interior, in order to fix the holding fixture immovably.

In an alternative embodiment, the locking devices and levers, 19, 28, 38 are in the form of eccentric levers or quick release devices.

The base plate 2 may also be so designed vertically that the fastening sections 7, 30 are an integral part of the base plate 2.

The base plate 2 may also have a different shape, e.g. polygonal or circular.

The U-shaped clamping brackets 21, 32 may also be made in one-piece.

It is also possible to provide for the clamping brackets 21, 32 to be roughly T-shaped, i.e. that instead of two longitudinal struts 12, 22, only a central longitudinal strut is provided. Instead of the screw connections described above, other suitable connection means such as e.g. welded joints may also be provided.

In addition, the holding fixture 1 may also be designed without a coupling element 9 in such a way that the latching devices 18 are connected rigidly to the base plate via one hinge instead of two hinges 45, 47.

Figure 4:
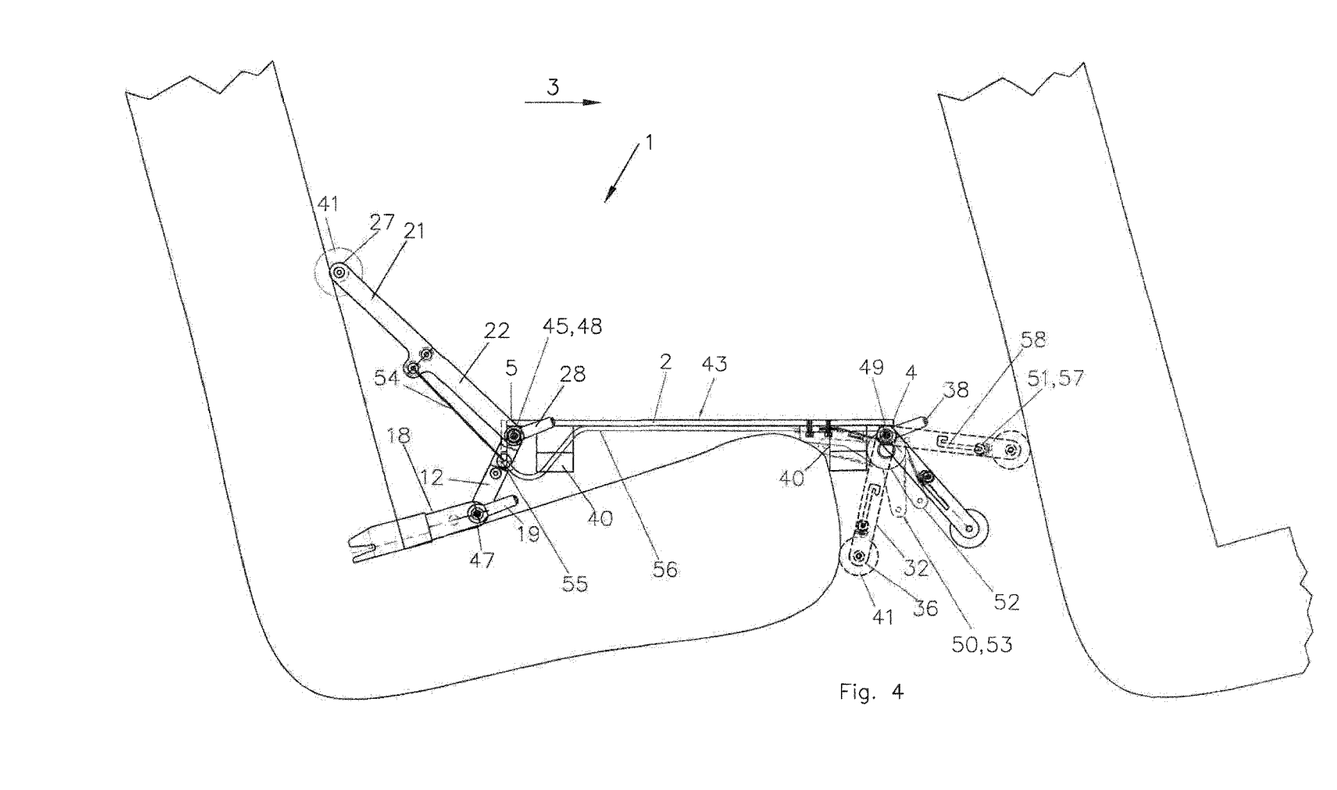
Figure 5:
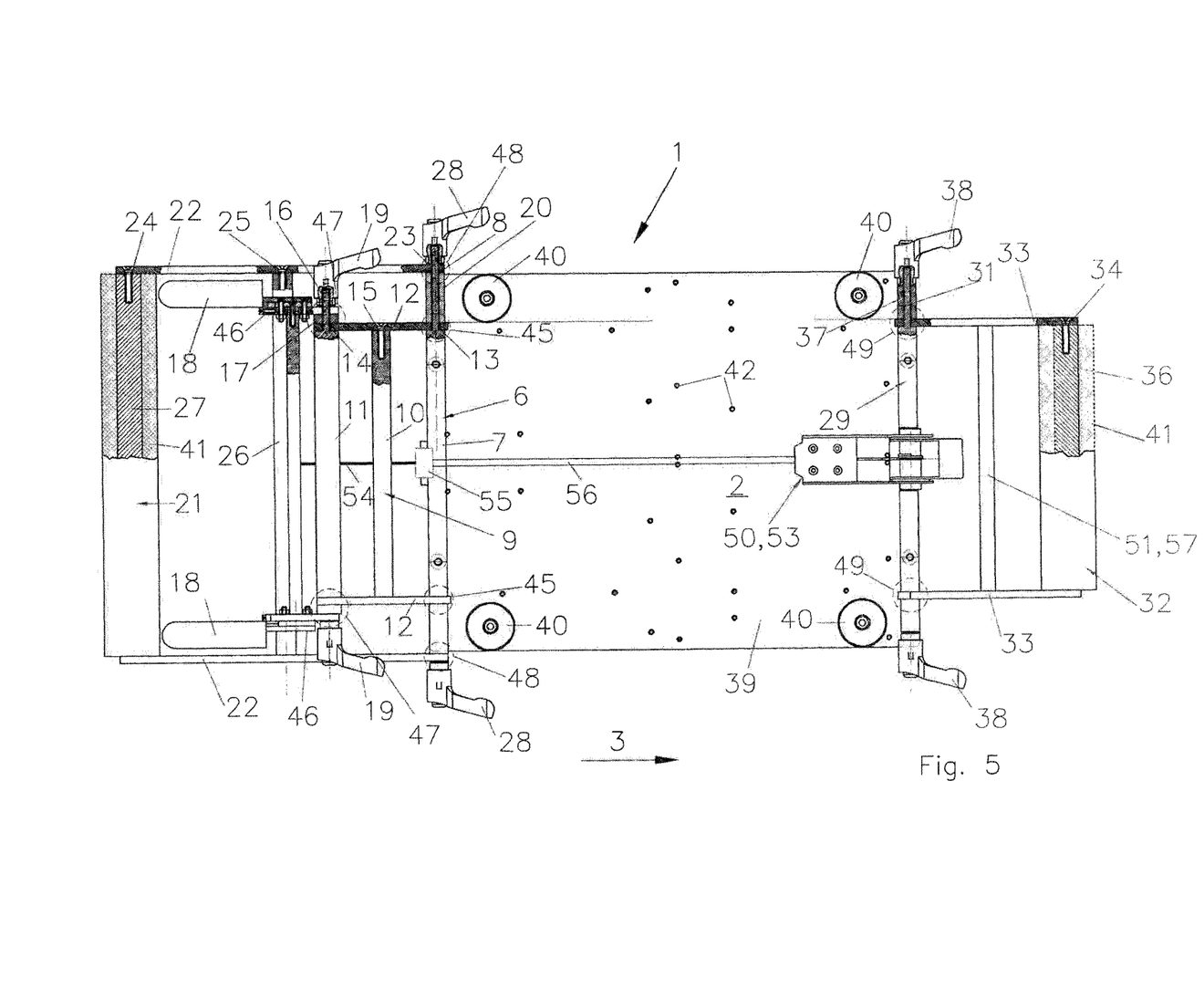
Figure 6:
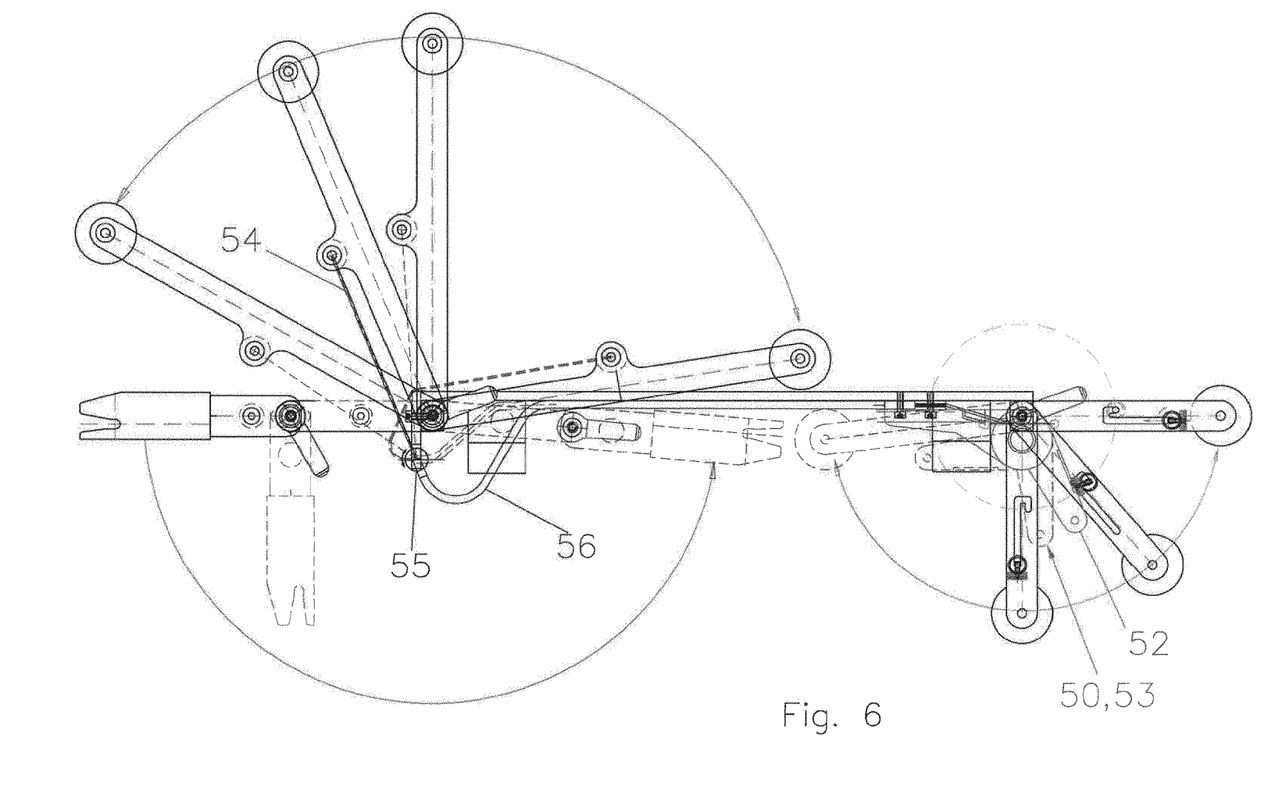

A further embodiment of the holding fixture 1 according to the invention is described below (FIGS. 4 to 6). Unless otherwise stated, this embodiment of the holding fixture 1 includes all features of the holding fixture described above. Identical parts are provided with the same reference numbers.

The holding fixture 1 has a bracing device 50 for actuating or bracing the locating device and the rear clamping bracket 21 respectively. By means of the bracing device 50, the rear clamping bracket 21 may be rotated around an axis of the rear hinge socket 6.

The bracing device 50 includes a connecting strut 51 extending parallel to the clamping strut 36 and between the two longitudinal struts 33.

Fitted to the underside of the base plate 2 is a ratchet device 53.

The ratchet device 53 is in the form of a turnbuckle of a tensioning belt. This means that a deflecting strut (not shown) and a knurled clamping jaw (not shown) are provided, which are pressed by a spring (not shown) against a strut (not shown). In this way, the cable may be pulled through in one direction, while on the other hand the clamping jaw is blocked in the other direction. The setting angle of the clamping jaw to the strut is critical for the fact that the turnbuckle, even under load, braces the holding fixture, in particular the rear clamping bracket 21, in the seat.

In the case of the ratchet device 53 of the present holding fixture, however, the static part of the turnbuckle is used as ratchet lever and the ratchet lever of the turnbuckle as the static part. In this way, it is possible for a user to tension the cable by pressing the front clamping bracket, and on pulling the clamping bracket or in ratcheting back without force, the magnetic force of the magnet is sufficient to take along the ratchet lever 52.

The connecting strut 51 forms an actuating element for a ratchet lever 52 of the ratchet device 53.

The connecting strut 51 also forms a thrust shaft 57 and has a magnet (not shown) roughly at its centre. The thrust shaft 57 is guided in suitable oblong holes 58 made in the longitudinal strut 33. The thrust shaft 57 may be made of two outer-lying tube sections and a magnet arranged between them, e.g. a ring magnet. An alternative option is to have a mechanical coupling of the connecting strut 51 with the ratchet lever 52 via suitable latching means or a slide.

The ratchet lever 52 is connected to the connecting strut 51 via the thrust shaft 57 with magnet. So that, after bracing of the rear clamping bracket 21, the front clamping bracket may also be positioned, the magnetic connection between thrust shaft and connecting strut 51 is provided by means of the magnet. Through the magnetic connection, the connecting strut 51 may be disconnected from the thrust shaft 57, so that the front clamping bracket 32 is once again freely movable for bracing the holding fixture 1 firmly in the vehicle interior.

The ratchet device 53 is therefore so actuable, by actuation or pressing of the front clamping bracket 32, that the latter rotates around the axis of the front hinge socket 29.

The ratchet device 53 actuates a cable 54 which is fastened roughly in the centre, in the area of the longitudinal struts 22, to the connecting strut 26 of the rear clamping bracket 21.

A deflecting device (not shown) may be provided to deflect and guide the cable. Preferably a holding device 55 is provided. The holding device 55 is located on the underside of the base plate 2 of the holding fixture 1, roughly in the area of the fastening section 7, and is preferably rotatably mounted.

The cable 54 is preferably a control cable, with the corresponding holding device 55 then being in the form of a control cable holder. Guidance of the cable from the ratchet device 53 to the holding device 55 is effected by means of a suitable control cable sleeve.

Figure 7:
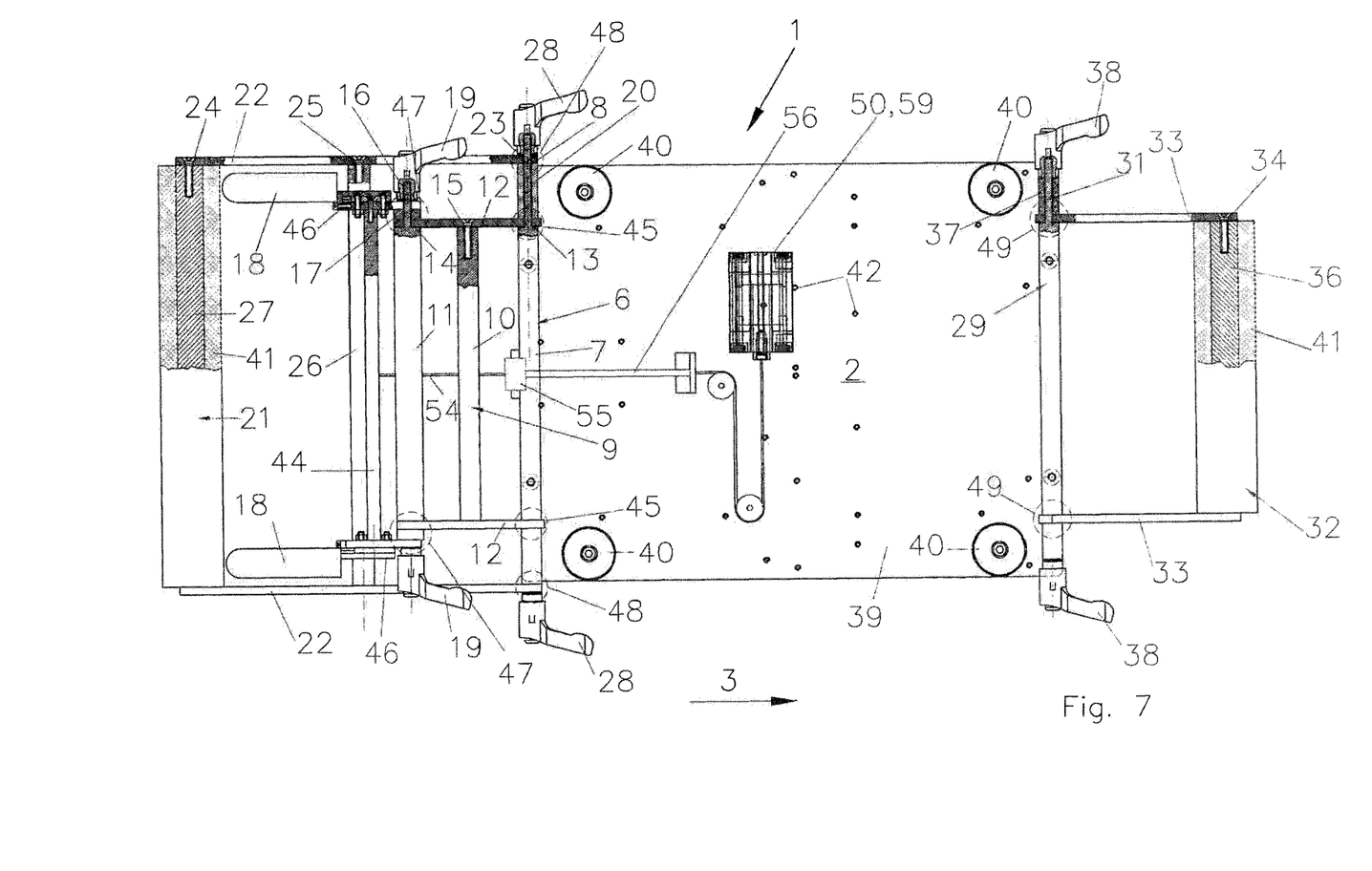

It is also possible, as an alternative to the ratchet device 53 described above, to provide the bracing device 50 as a pneumatic or hydraulic device for actuation of the cable by means of a pneumatic cylinder 59 (FIG. 7).

The pressurisation of such a pneumatic cylinder 59 may be effected by means of a pinch valve. Alternatively, it is also possible to provide for actuation a small compressor or a pump actuable manually via the clamping bracket 32.

Alternatively, the ratchet device may also be actuated directly at the ratchet lever 52 without a clamping bracket mounting section 32 or thrust shaft 57.

Similarly, instead of a cable designed as a control cable and therefore made of metal, a cable of natural or synthetic fibres, a belt or a chain block, may also be provided.

As an alternative to the bracing device 50 described above, this may also have an electrical windlass (not shown).

In the two embodiments of the holding fixture 1 described above, it may be provided for the holding fixture to be clamped via the front clamping bracket 32 to a backrest of a seat, in particular a front seat. The clamping is effected in an analogous manner to the clamping of the front clamping bracket (FIG. 6) described in the first embodiment.

The front locating device may, instead of a clamping bracket, be in the form of a belt, in particular a tensioning belt, in order to fix the holding fixture in a vehicle interior. This is especially advantageous for many sports cars, which have only limited space in the area of the foot well of the rear seats.

LIST OF REFERENCE NUMBERS

1 holding fixture
2 base plate
3 vehicle axial direction
4 front edge
5 rear edge
6 rear hinge socket
7 fastening section
8 threaded rod
9 coupling element
10 reinforcing strut
11 connecting strut
12 longitudinal strut
13 front hole
14 rear hole
15 centre hole
16 threaded rod
17 spacer sleeve
18 latching device
19 lever
20 spacer sleeve
21 rear locating device/rear clamping bracket
22 longitudinal strut
23 front hole
24 rear hole
25 centre hole
26 connecting strut
27 rear clamping strut
28 lever
29 front hinge socket
30 fastening section
31 threaded rod
32 front locating device/front clamping bracket
33 longitudinal strut
34 front hole
35 rear hole 36 front clamping strut
37 spacer sleeve
38 lever
39 underside
40 support leg
41 contact means
42 hole
43 top side
44 spacer strut
45 first coupling bearing
46 section
47 second coupling bearing
48 rear locating hinge
49 front locating hinge
50 bracing device
51 connecting strut
52 ratchet lever
53 ratchet device
54 cable
55 holding device
56 control cable sleeve
57 thrust shaft
58 oblong hole
59 pneumatic cylinder

The invention claimed is:

1. Holding device for fitting in a motor vehicle including:
a base plate configured to be positioned in an area of a vehicle seat, with a front edge in a vehicle axial direction and a rear edge in the vehicle axial direction,
wherein the base plate has two latching devices on the rear edge in the vehicle axial direction, the two latching devices for connecting with a fastening point of a motor vehicle, and
the base plate has, on the front and rear edge in the vehicle axial direction, a corresponding front and rear locating device which is hinged to the base plate and designed so that the base plate may be fixed immovably in the area of the vehicle seat,
wherein the two latching devices are connected to a coupling element in a hinged and lockable manner, and the coupling element is connected in a hinged and lockable manner to the rear edge of the base plate in the vehicle axial direction.

2. Holding device according to claim 1,
wherein the front and rear locating devices are in the form of clamping brackets which are steplessly adjustable and are lockable such that the clamping brackets are fixed in an angular position, so that the base plate is fixed horizontally in the area of the vehicle seat by the clamping brackets, or that the front clamping bracket is a tensioning belt.

3. Holding device according to claim 1,
wherein the locating devices and/or the latching devices are fixable in their position relative to the base plate by suitable locking devices.

4. Holding device according to claim 1,
wherein the locating devices and the latching devices exert such forces on the base plate that the base plate is immovably braced in the area of the vehicle seat.

5. Holding device according to claim 1,
wherein the locating devices have elastic contact means for contact with a vehicle interior.

6. Holding device according to claim 1,
further comprising a bracing device, the bracing device bracing the rear locating device in the direction of a backrest of the vehicle seat.

7. Holding device according to claim 6,
wherein the bracing device includes a ratchet device, wherein the front locating device is connected to an actuating element of the ratchet device, and wherein the ratchet device is connected via a cable and a deflecting device to the rear locating device in such a way that the rear locating device is braced in the direction of the backrest of the vehicle seat.

8. Holding device according to claim 1,
wherein the holding fixture is foldable.

9. Holding device according to claim 1,
wherein the holding fixture has support legs.

10. Holding device according to claim 1,
wherein the holding fixture has a measuring instrument to indicate the horizontal alignment of the base plate.

11. Holding device according to claim 1,
wherein the rear locating device rests against a backrest of the vehicle seat.

12. Holding device according to claim 1,
wherein the front locating device rests against a vertical section of a seating surface or a backrest of the vehicle seat or on a vertical or horizontal section of a foot well of the motor vehicle.

13. Holding device according to claim 1,
wherein the fastening point of the motor vehicle is an ISOFIX anchor of the motor vehicle.

* * * * *